United States Patent [19]

Okada

[11] Patent Number: 4,612,436

[45] Date of Patent: Sep. 16, 1986

[54] READING AND WRITING APPARATUS FOR ID CARDS

[75] Inventor: Toshihiko Okada, Tokyo, Japan

[73] Assignee: Oki Electric Industry Co., Ltd., Tokyo, Japan

[21] Appl. No.: 636,162

[22] Filed: Jul. 31, 1984

[30] Foreign Application Priority Data

Aug. 1, 1983 [JP] Japan .................................. 58-139503

[51] Int. Cl.⁴ ................................................ G06K 7/08
[52] U.S. Cl. ..................................... 235/449; 235/492
[58] Field of Search ................................. 235/449, 492

[56] References Cited

U.S. PATENT DOCUMENTS 4,024,397  5/1977  Pfost ..................................... 235/449

Primary Examiner—Harold I. Pitts
Attorney, Agent, or Firm—Peter L. Berger

[57] ABSTRACT

The present invention relates to a read and/or write apparatus for ID cards, wherein a magnetic read head for reading at least a magnetic stripe and a magnetic write head are disposed along a running passage for identification cards (hereinafter referred to as "ID cards") for use with an automatic teller system, a credit card system or other various account maintenance systems. Also, connecting member to be connected to a set of connecting terminals of an integrated circuit built in an ID card is provided. The apparatus provides for the reading and/or writing on three kinds of ID cards, that is, an ID card having at least a magnetic stripe, an ID card having at least a magnetic stripe and an integrated circuit built therein and an ID card having at least an integrated circuit built therein but having no magnetic stripe.

2 Claims, 6 Drawing Figures

Fig. 1
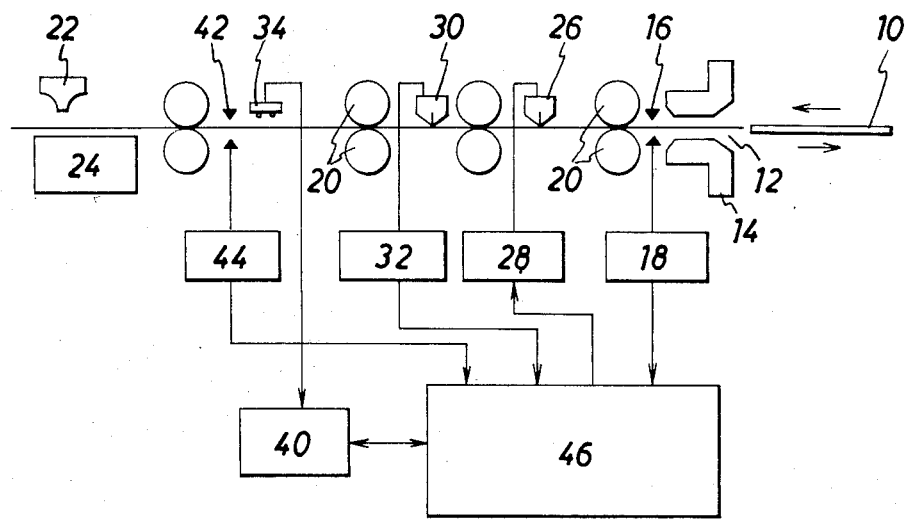
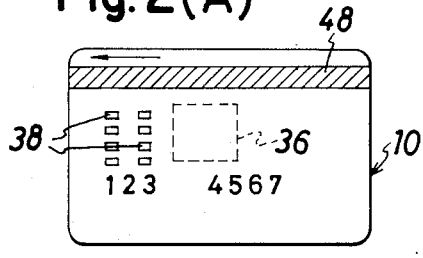
Fig. 2(A)
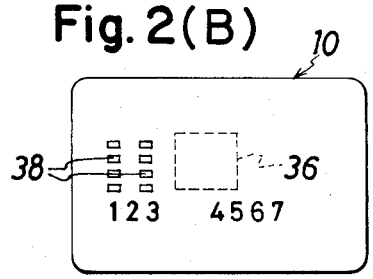
Fig. 2(B)
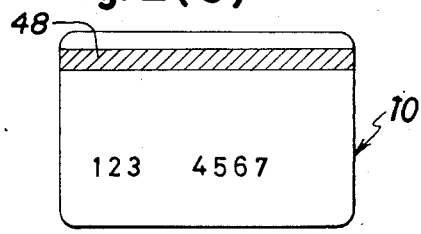
Fig. 2(C)

READING AND WRITING APPARATUS FOR ID CARDS

BACKGROUND OF THE INVENTION (1) Field of the Invention:

The present invention relates to a read and/or write apparatus for ID cards to be used in connection with an automatic teller system, a credit card system or other various account maintenance systems.

(2) Description of the Prior Art:

In automatic depositing and paying teller systems, ID cards having at least a magnetic stripe are used so as to expedite transactions and secure the safety. However, at the present, since data of the magnetic stripe can easily be read by a third person, the safety is reduced.

As a means of increasing the safety, there have been proposed ID cards having an integrated circuit (hereinafter referred to as "IC") built in herein. However, if all the ID cards having at least a magnetic stripe are simultaneously changed to IC provided ID cards, automatic depositing and paying machines and other transaction systems must be remodelled at one time. Moreover, abrupt exchange of all of the customers' cards for IC-provided ID cards will result in great confusion and inconvenience.

SUMMARY OF THE INVENTION

The present invention relates to a read and/or write apparatus for ID cards, wherein a magnetic read head for reading at least a magnetic stripe and a magnetic write head are disposed on a running passage for ID cards and a connecting member to be connected to a set of connecting terminals of an integrated circuit built in an ID card is arranged, so that read and/or write can be effected on three kinds of ID cards, that is, an ID card having at least a magnetic stripe, and ID card having at least a magnetic stripe and an integrated circuit built therein and an ID card having at least an integrated circuit built therein but having no magnetic stripe.

The primary object of the present invention having the above-mentioned structure is to provide a read and/or write apparatus for ID cards, for which ID cards having at least a magnetic stripe and IC-provided ID cards can be similarly used.

BRIEF DESCRIPTION OF THE DRAWINGS

FIG. 1 is a systematic view illustrating one embodiment of the present invention.

FIG. 2-(A) is a plane view showing an ID card having a magnetic stripe and having an IC built therein, FIG. 2-(B) is a plane view showing an IC-provided ID card, and FIG. 2-(C) is a plane view showing an ID card having a magnetic stripe.

DETAILED DESCRIPTION OF THE PREFERRED EMBODIMENTS

Figure 3:
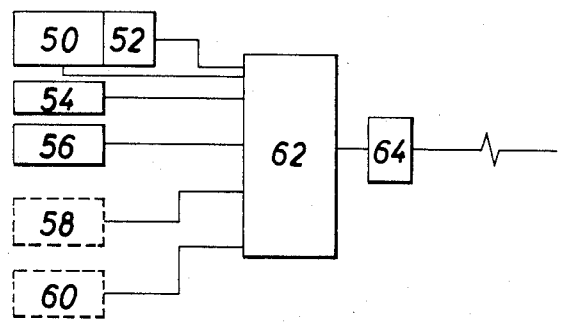
FIG. 3 is a block diagram showing an automatic depositing and paying teller machine to which the present invention is applied.

One embodiment of the present invention will now be described in detail with reference to the accompanying drawings.

Reference numeral 10 represents an ID card and reference numeral 12 represents a card inserting opening which is defined by an insertion guide. Insertion of the ID card 10 into the apparatus is detected by a card insertion sensor 16. Reference numeral 18 represents a sensor amplifier. Delivery rollers 20 are disposed to deliver the ID card 10 toward a receipt printing unit 22 and an imprinting unit 24. A magnetic write head 26 and a magnetic read head 30 are arranged on a running passage for the ID card 10. Reference numeral 28 represents a writing driver and reference numeral 32 represents a reading amplifier.

An IC-connecting member 34 to be connected to connecting terminals 38 of an IC 36 built in the ID card 10 is arranged on the running passage for the ID card 10. Referencenumeral 40 represents an IC read and/or write circuit, reference numeral 42 represents a sensor for detecting read and/or write position of the ID card, reference numeral 44 represents a sensor amplifier, and reference numeral 46 represents a control unit for controlling the sensor amplifier 18, the writing driver 28, the reading amplifier 32, the IC read and/or write circuit 40 and the sensor amplifier 44.

FIGS. 2-(A), 2-(B) and 2-(C) are plane views showing examples of the ID cards used in the present invention. More specifically, FIG. 2-(A) shows an ID card having a magnetic stripe 48 and also having an IC 36 built therein, which has a set of connecting terminals 38, FIG. 2-(B) shows an ID card 10 having an IC 36 built therein, which has a set of connecting terminals 38, and FIG. 2-(C) shows an ID card 10 having only a magnetic stripe 48.

Figure 4:
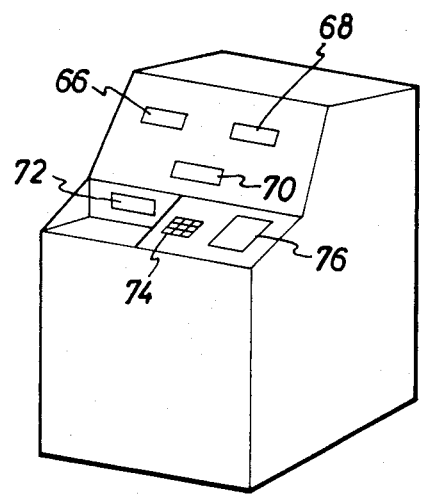
FIG. 4 is a perspective view showing an automatic depositing and paying teller machine.

FIG. 3 is a block diagram of an automatic depositing and paying teller machine to which the present invention is applied, and FIG. 4 is a perspective view showing an example of this machine. Reference numeral 50 represents a read and/or write of the magnetic stripe and IC, reference numeral 52 represents an imprinter and receipt printing unit, reference numeral 54 represents an operation and display unit, reference numeral 56 represents a cash counting unit, reference numeral 58 represents a received money counting zones, reference numeral 60 represents counting zones, reference numeral 60 represents a bank book registry device, reference numeral 62 represents a control unit for controlling the respective units, and reference numeral 64 represents a circuit control unit.

Reference numeral 66 represents a card inserting portion, reference numeral 68 represents a bankbook inserting portion, reference numeral 70 represents a operation display portion, reference numeral 72 represents a bill receiving portion, referrence numeral 74 represents an operation portion and reference numeral 76 represents a bill inserting portion.

The operation of the above-mentioned structure will now be described.

When data of a presently used ID card 10 having only a magnetic stripe 48 are read, the ID card 10 is inserted from the card inserting opening 12, and when insertion of the ID card 10 is detected by the card insertion sensor 16, the delivery rollers 20 are driven to feed the ID card 10 toward the magnetic read head 30. The data of the ID card 10 are read by the magnetic reading head 30, and output data are stored in the control unit 46. If the output data are correct, the transaction is carried out.

In case of an ID card 10 having a magnetic stripe 48 and an IC 36 built therein, the ID card 10 is inserted from the card inserting opening 12, and when insertion of the IC card 10 is detected by the card insertion sensor 16, the delivery rollers 20 are driven to feed the ID card 10 toward the magnetic read head 30. It is judged by the control unit 46 whether or not there are output data of the magnetic read head 30, and if the data are correct, the transaction is carried out. If it is judged that the data are not correct, the ID card 10 is delivered by the delivery rollers 20 so that the connection member 34 is connected to the set of connecting terminals 38 of the ID card 10. Thus, the data of the ID card are read, and if the read data are correct, the transaction is carried out, while the transaction is not performed if the data are not correct.

In case of an ID card 10 having an IC 36 built therein, which has a set of connecting terminals 38, the ID card 10 is inserted from the card inserting opening 12, and when insertion of the card 10 is detected by the card insertion sensor 16, the delivery rollers 20 are driven to deliver the ID card toward the magnetic read head 30. It is judged by the control unit 46 whether or not there are output data of the magnetic read head 30.

In this case, since the magnetic stripe 48 is not formed on the ID card 10 provided with the IC 36, the ID card 10 is delivered by driving the delivery rollers 20, and the connecting member 34 is connected to the set of connecting terminals 38 of the ID card 10 to read data of the ID card 10. If the data are correct, the transaction is carried out while the transaction is not performed if the data are not correct.

The transaction is performed according to the foregoing procedures.

Writing, that is, the operation of putting information into the ID card, is accomplished by conducting the above procesures on the magnetic stripe 48 and IC 36 in the reverse order to the above-mentioned order. This operation will now be described.

When writing is effected on an ID card 10 having only a magnetic stripe 48, by detection of insertion of the ID card 10 by the card insertion sensor 16, the delivery rollers 20 are driven to deliver the ID card 10 toward the magnetic write head 26. The writing driver 28 is operated by the magnetic write head 26 to write data into the ID card 10. Then, the data of the ID card 10 are read by the magnetic read head 30 and the output data are compared with the written data. If the output data are correct, it is judged that writing is completed, and the transaction is carried out.

When writing is effected on the IC 36, the connecting member 34 is connected to the set of connecting terminals 38 of the ID card 10, and data are written into the ID card 10 by the read and/or write circuit 40, and then the data of the ID card 10 are read again. If the data are correct, it is judged that writing is completed, and the transaction is carried out.

In the above-mentioned writing operation, whether writing is effected on the magnetic stripe 48 or the IC 36 is selected in the same manner as described above with respect to reading of data, and the writing operation is carried out after the reading operation.

In the foregoing embodiment, the magnetic read head 30 for reading the magnetic stripe 48 is located before the connecting member 34 to be connected to the set of connecting terminal 38 of the IC 36. However, the positions of the read head 30 and the connecting member 34 may be reversed. In this case, of course, also the operation order is reversed.

As is apparent from the foregoing description, according to the present invention, a magnetic read head for reading at least a magnetic stripe and a magnetic write head are dis-posed on a running passage for ID cards in a read and write apparatus for ID cards, and a connecting member to be connected to a set of connecting terminals of an IC builtin an ID card is arranged, whereby reading and writing can be performed on three kinds of ID cards, that is an ID card having at least a magnetic stripe, an ID card having at least a magnetic stripe and having an IC built therein and an ID card having at least an IC built therein and having no magnetic stripe. Therefore, magnetic stripe-provided ID cards and IC-provided ID cards can simultaneously be used without changing the working method or teller machine and without causing any social problem.

What is claimed is:

1. An apparatus for the reading and writing with an identification card having at least one of a magnetic strip or an integrated circuit with connecting terminals; said apparatus comprising;

a magnetic writing head, an integrated circuit connecting means disposed along a passage through which said identification card passes said magnetic reading head said magnetic writing head being aligned with said magnetic strip incorporated within said identification card, and said integrated circuit connecting means being aligned with said integrated circuit connecting terminals incorporated within said identification card so as to read and write with said identification card.

2. An apparatus as set forth in claim 1 wherein said magnetic write head is connected to a control unit through a writing driver, said magnetic read head is connected to said control unit through a reading amplifier and said integrated circuit connecting means is connected to said control unit through a read/write circuit for the integrated circuit.

* * * * *